United States Patent
Yan

(10) Patent No.: US 7,551,248 B2
(45) Date of Patent: Jun. 23, 2009

(54) TRANSFLECTIVE LIQUID CRYSTAL DISPLAY AND PANEL THEREOF

(75) Inventor: Tzu-Min Yan, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 241 days.

(21) Appl. No.: 11/633,163

(22) Filed: Dec. 4, 2006

(65) Prior Publication Data
US 2007/0126952 A1 Jun. 7, 2007

(30) Foreign Application Priority Data
Dec. 2, 2005 (TW) .............................. 94142483 A

(51) Int. Cl.
*G02F 1/1335* (2006.01)
(52) U.S. Cl. ........................................ 349/114; 349/106
(58) Field of Classification Search ................. 349/114, 349/106
See application file for complete search history.

(56) References Cited

U.S. PATENT DOCUMENTS

| 6,501,521 B2 | 12/2002 | Matsushita et al. |
| 6,885,418 B2 | 4/2005 | Matsushita et al. |
| 7,030,946 B2 * | 4/2006 | Iijima et al. ................. 349/106 |

* cited by examiner

*Primary Examiner*—Thoi V Duong
(74) *Attorney, Agent, or Firm*—Wei Te Chung

(57) ABSTRACT

A transflective liquid crystal display panel (210) includes a first substrate (21), a second substrate (23), and a liquid crystal layer (22) therebetween. The first substrate has a color filter layer (40) with red filter units (41), green filter units (42), and blue filter units (43). Each of the red, green, and blue filter units defines an opening (44). The openings of different color filter units have a same area and shape. The second substrate includes sub-pixels corresponding to the red, green, and blue filter units respectively. Each of the sub-pixels includes a transmissive electrode (510, 520, 530), and a reflective electrode (410, 420, 430) corresponding to one of the openings of the red, green, and blue filter units. The areas of the reflective electrodes of each of the red sub-pixels, each of the green sub-pixels, and each of the blue sub-pixels are all different from one another.

14 Claims, 3 Drawing Sheets

TRANSFLECTIVE LIQUID CRYSTAL DISPLAY AND PANEL THEREOF

BACKGROUND OF THE INVENTION

1. Field of the Invention

The present invention relates to liquid crystal displays, and in particular to a transflective liquid crystal display having uniform openings in different color filter units of a color filter layer and corresponding reflective electrodes with different areas.

2. General Background

Liquid crystal displays (LCDs) generally have advantages of lightness in weight, a thin shape, flexible sizing, and low power consumption. For these reasons, LCDs are widely used in portable products such as laptops, personal digital assistants, mobile phones, and so on. Conventional transmissive LCD devices require an accompanying backlight to provide the light needed to illuminate liquid crystal of the LCD, so that the LCD can provide images for display. Typically, an LCD together with a backlight module is installed in a portable product. However, in these kinds of portable products or devices, it is desired to reduce power consumption of the backlight modules and increase a contrast ratio of the LCD in direct light. As a result, a transflective type of LCD was developed.

FIG. 5 is a schematic, side cross-sectional view of part of a conventional transflective LCD. The transflective LCD 100 includes an LCD panel (not labeled) and a backlight module 140. The LCD panel includes a first substrate 110, a second substrate 130, and a liquid crystal layer 120 interposed between the first and second substrates 110, 130. The backlight module 140 is disposed adjacent to the second substrate 130.

The first substrate 110 includes a first glass substrate 111 having a color filter layer 112 and a common electrode layer 116 sequentially formed on an inner face thereof. The color filter layer 112 includes a plurality of red filter units 113, green filter units 114, and blue filter units 115 arranged in a matrix. For simplicity, FIG. 5 only shows one of the red filter units 113, one of the green filter units 114, and one of the blue filter units 115. Each of the red filter units 113, green filter units 114, and blue filter units 115 has an opening 119 through the color filter layer 112.

The second substrate 130 includes a second glass substrate 131 having an insulation layer 132 and a conductive layer (not labeled) sequentially formed on an inner face thereof. The conductive layer is divided into a plurality of sub-pixel units 133. The sub-pixel units 133 are arranged in a matrix corresponding to the matrix of the red filter units 113, the green filter units 114, and the blue filter units 115. Each of the sub-pixel units 133 includes a transmissive electrode 134 and a reflective electrode 135. The transmissive electrode 134 of each sub-pixel unit 133 defines a vertical transmissive region of the LCD panel thereat. The reflective electrode 135 of each sub-pixel unit 133 defines a vertical reflective region of the LCD panel thereat.

When the transflective LCD 100 functions normally, light provided by a backlight module (not shown) below the second substrate 130 sequentially passes through the second glass substrate 131, the insulation layer 132, the transmissive electrodes 134, the liquid crystal layer 120, the common electrode layer 116, the color filter layer 112, and the first glass substrate 111. Thus the backlight module provides light for displaying of images by the transflective LCD 100. Simultaneously, light provided by an external light source (such as sunshine or an indoor light, not shown) above the first substrate 110 sequentially passes through the first glass substrate 111, the color filter layer 112, the common electrode layer 116, and the liquid crystal layer 120. Some of this light is then reflected by the reflective electrodes 135 of the sub-pixel units 133. The reflective light passes back through the liquid crystal layer 120, the common electrode layer 116, the color filter layer 112, and the first glass substrate 111, and thereby provides additional light for displaying of images by the transflective LCD 100.

The openings 119 formed in each of the red filter units 113, the green filter units 114, and the blue filter units 115 of the transflective LCD 100 correspond to the locations of the reflective regions defined by the reflective electrodes 135 of the sub-pixel units 133. Therefore, part of the outgoing reflective light directly passes through the openings 119 without passing through the colored parts of the color filter units 113, 114, 115 of the color filter layer 112. This can increase the luminance of the reflective regions of the transflective LCD 100.

FIG. 6 is a schematic, top plan view of a part of the color filter layer 112 corresponding to the part thereof shown in FIG. 5. Referring to FIGS. 5 and 6, the areas of the openings 119 of the three different color filter units 113, 114, 115 are different. That is, the openings 119 of the green filter units 114 are larger than the openings 119 of the red filter units 113, and the openings 119 of the red filter units 113 are larger than the openings 119 of the blue filter units 115. The reflective light passing through the color filter layer 112 includes two portions. One portion is the light passing through the colored parts of the color filter units 113, 114, 115, and the other portion is the light directly passing through the openings 119 of the color filter units 113, 114, 115. The luminance in the reflective regions can be enhanced because white light directly passing through the openings 119 is not absorbed at all by the colored parts of the color filter units 113, 114, 115.

The reflective regions corresponding to the green filter units 114 are brighter than those corresponding to the red filter units 113 and the blue filter units 115, because the openings 119 of the green filter units 114 are larger than the openings 119 of the red filter units 113 and the blue filter units 115. Similarly, the reflective regions corresponding to the red filter units 113 are brighter than those corresponding to the blue filter units 115, because the openings 119 of the red filter units 113 are larger than the openings 119 of the blue filter units 115. Thus the chromaticity of the reflective light meets the requirements of CIE chromaticity coordinates for display devices, which requires that the luminance of green light is the largest, the luminance of red light is the second largest, and the luminance of blue light is the smallest.

During manufacturing of the color filter layer 112 of the transflective LCD 100, the different color filter units 113, 114, 115 are formed separately and sequentially. However, the areas of the openings 119 of the red filter units 113, the green filter units 114, and the blue filter units 115 are different. Therefore, the manufacturing process requires three different photolithography masks with three different opening patterns for the different color filter units 113, 114, 115. The cost of fabrication of all the masks is correspondingly high. Hence, there is a need for a simpler and inexpensive configuration for a transflective LCD which requires fewer photo masks in the manufacturing process.

SUMMARY

Embodiments of the invention provide a transflective LCD having similar openings in a color filter layer and corresponding reflective electrodes with different areas.

One embodiment provides a liquid crystal display panel, including a first substrate, a second substrate, and a liquid crystal layer disposed therebetween. The first substrate has a color filter layer with a plurality of red filter units, green filter units, and blue filter units. Each of the red filter units, the green filter units, and the blue filter units of the color filter layer defines an opening. The openings of different color filter units have the same area and the same shape. The second substrate includes a plurality of red sub-pixels, green sub-pixels, and blue sub-pixels corresponding to the red filter units, the green filter units, and the blue filter units respectively. Each of the red sub-pixels, the green sub-pixels, and the blue sub-pixels includes a transmissive electrode and a reflective electrode. The reflective electrodes corresponding to the openings of the red filter units, the green filter units, and the blue filter units. An area of the reflective electrode of each of the green sub-pixels, and an area of the reflective electrode of each of the blue sub-pixels are all different from one another.

A detailed description of various embodiments is given below with reference to the accompanying drawings. In the drawings, all the views are schematic.

DETAILED DESCRIPTION

Figure 1:
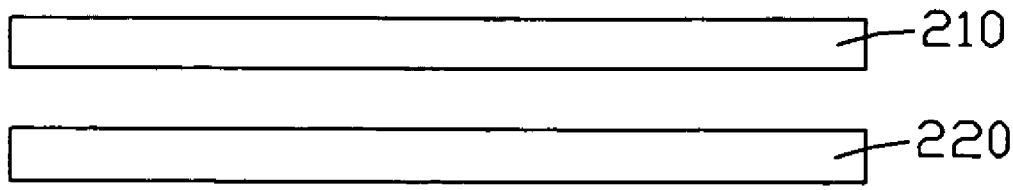
FIG. 1 is an exploded, side view of a transflective LCD in accordance with a first exemplary embodiment of the present invention, the transflective LCD including a transflective LCD panel and a backlight module.

FIG. 1 is a schematic exploded, side view of a transflective LCD 200 in accordance with a first exemplary embodiment of the present invention. The transflective LCD 200 includes a transflective LCD panel 210 and a backlight module 220.

Figure 2:
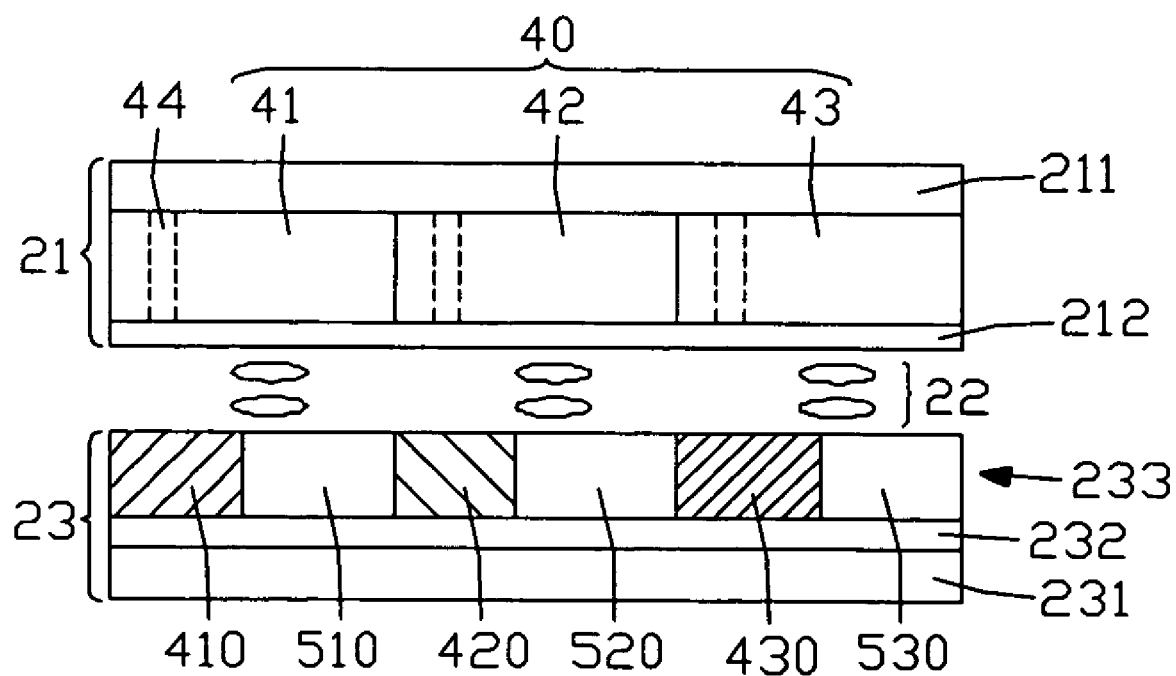
FIG. 2 is an enlarged, cross-sectional view of a part of the transflective LCD panel of FIG. 1, the transflective LCD panel including a color filter layer and a conductive layer.

FIG. 2 is an enlarged, cross-sectional view of a part of the transflective LCD panel 210. The transflective LCD panel 210 includes a first substrate 21, a second substrate 23, and a liquid crystal layer 22 interposed between the first and second substrates 21, 23. The backlight module 140 is disposed adjacent to an underside of the second substrate 130.

The first substrate 21 includes a first glass substrate 211 having a color filter layer 40 and a common electrode layer 212 sequentially formed on an inner face thereof. The color filter layer 40 includes a plurality of discrete red filter units 41, green filter units 42, and blue filter units 43 arranged in a matrix. For simplicity, FIG. 2 only shows one of the red filter units 41, one of the green filter units 42, and one of the blue filter units 43. Each of the red filter units 41, the green filter units 42, and the blue filter units 43 has an opening 44.

Figure 3:
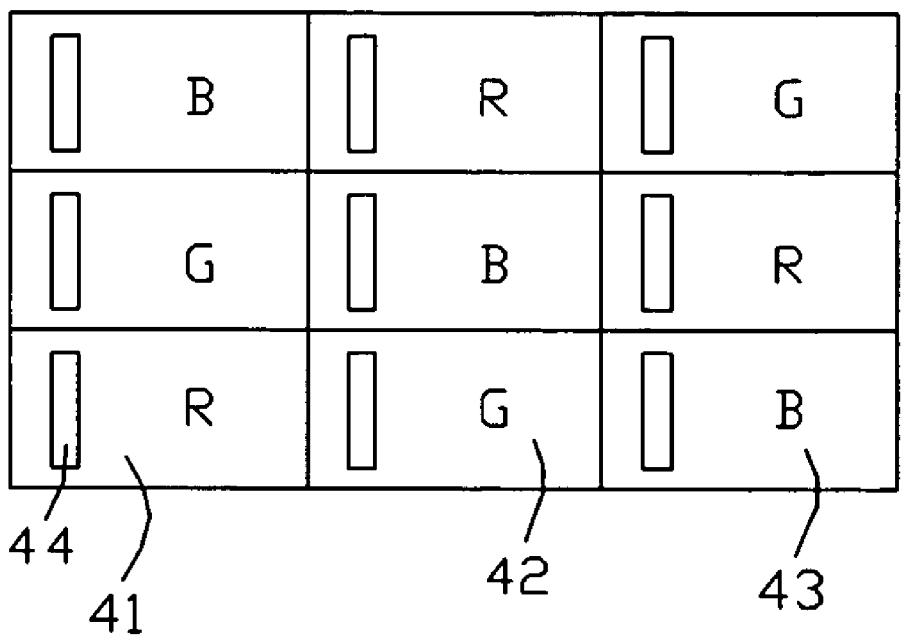
FIG. 3 is a top plan view of a part of the color filter layer of the transflective LCD panel of the first exemplary embodiment, corresponding to the part of the color filter layer shown in FIG. 2.

FIG. 3 is a top plan view of a part of the color filter layer 40. Referring to FIGS. 2 and 3, all of the openings 44 of the red filter units 41, the green filter units 42, and the blue filter units 43 have a same area and a same shape. In the illustrated embodiment, the openings 44 are rectangular. In alternative embodiments, the openings 44 can be circular or have other suitable shapes. The area of the openings 44 depends on the required chromaticity proportions of red, green, and blue of the transflective LCD 200.

The second substrate 23 includes a second glass substrate 231 having an insulation layer 232 and a conductive layer 233 sequentially formed on an inner face thereof. The conductive layer 233 is divided into a plurality of sub-pixel units (not labeled). The sub-pixel units are arranged in a matrix corresponding to the matrix of the red filter units 41, the green filter units 42, and the blue filter units 43. Each of the sub-pixel units includes a transmissive electrode 510, 520, or 530 and a reflective electrode 410, 420, or 430. The transmissive electrode 510, 520, or 530 of each sub-pixel unit defines a vertical transmissive region of the transflective LCD panel 210 thereat. The reflective electrode 410, 420, or 430 of each sub-pixel unit defines a vertical reflective region of the transflective LCD panel 210 thereat. The openings 44 formed in each of the red filter units 41, the green filter units 42, and the blue filter units 43 are located in the reflective regions defined by the reflective electrodes 410, 420, 430 of the sub-pixel units.

Figure 4:
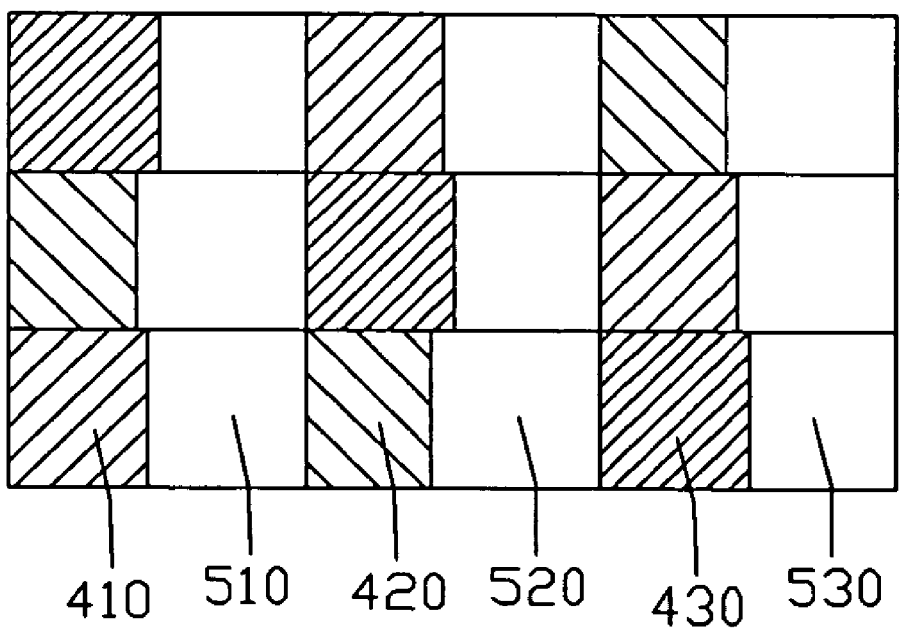
FIG. 4 is a top plan view of a part of the conductive layer of the transflective LCD panel of the first exemplary embodiment, corresponding to the part of the conductive layer shown in FIG. 2 and the part of the color filter layer shown in FIG. 3.
Figure 5:
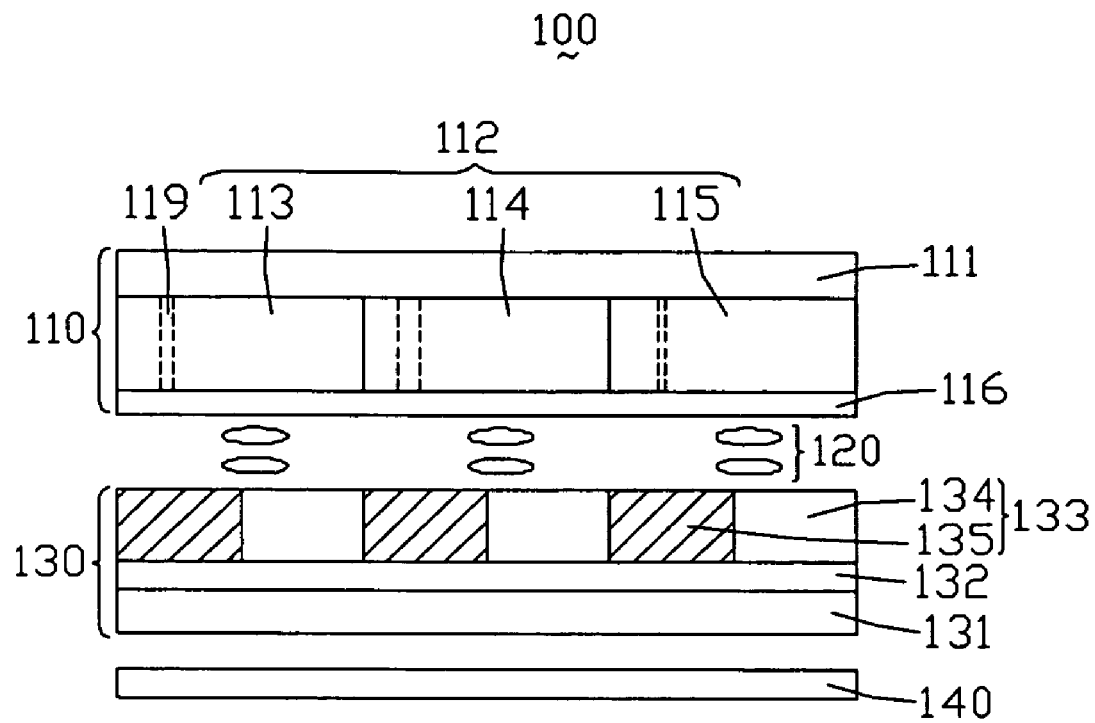
FIG. 5 is an exploded, side cross-sectional view of a conventional transflective LCD, the transflective LCD including a color filter layer.
Figure 6:
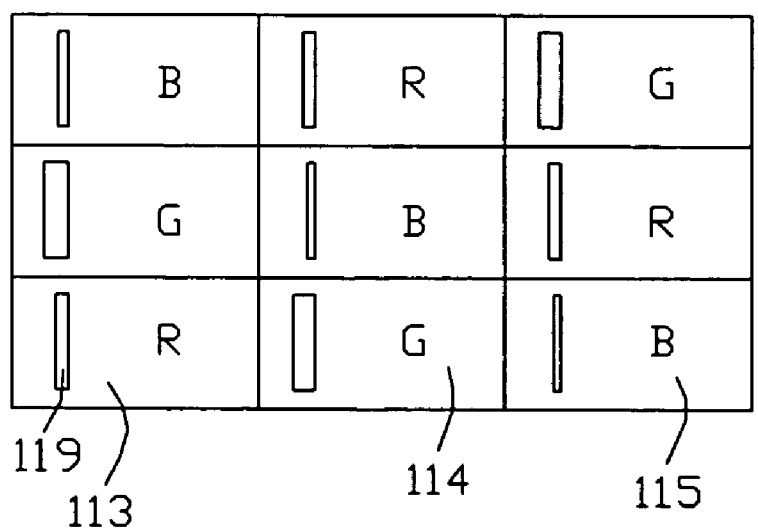
FIG. 6 is a top plan view of a part of the color filter layer of the conventional transflective LCD, corresponding to the part of the color filter layer shown in FIG. 5.

FIG. 4 is a top plan view of a part of the conductive layer 233, corresponding to the part of the conductive layer 233 shown in FIG. 2 and the part of the color filter layer 40 shown in FIG. 3. As shown in FIGS. 3 and 4, the area of each of the reflective electrodes 430 corresponding to the blue filter units 43 is larger than the area of each of the reflective electrodes 410 corresponding to the red filter units 41. The area of each of the reflective electrodes 410 corresponding to the red filter units 41 is larger than the area of each of the reflective electrodes 420 corresponding to the green filter units 42. In contrast, the area of each of the transmissive electrodes 520 corresponding to the green filter units 42 is larger than the area of each of the transmissive electrodes 510 corresponding to the red filter units 41. Further, the area of each of the transmissive electrodes 510 corresponding to the red filter units 41 is larger than the area of each of the transmissive electrodes 530 corresponding to the blue filter units 43.

When the transflective LCD 200 functions normally, light provided by the backlight module 220 sequentially passes through the second glass substrate 231, the insulation layer 232, the transmissive electrodes 510, 520, 530, the liquid crystal layer 22, the common electrode 212, the color filter layer 40, and the first glass substrate 211. Simultaneously, light provided by an external light source (such as sunshine or an indoor light, not shown) above the transflective LCD panel 210 sequentially passes through the first glass substrate 211, the color filter layer 40, the common electrode 212, and the liquid crystal layer 22. Some of this light is then reflected by the reflective electrodes 410, 420, 430 of the sub-pixel units, and passes back through the liquid crystal layer 22, the common electrode 212, and the color filter layer 40 again.

Part of the reflected light directly passes through the openings 44 without being absorbed at all by colored parts of the red filter units 41, the green filter units 42, or the blue filter units 43. Therefore the luminance of the transflective LCD 200 at the reflective regions corresponding to the reflective electrodes 410, 420, 430 can be enhanced. The openings of the red filter units 41, the green filter units 42, and the blue filter units 43 of the color filter layer 40 all have the same shape and the same area. Nevertheless, the reflective regions corresponding to the green filter units 42 are brighter than those corresponding to the red filter units 41 and the blue filter units 43. This is because the ratio of an area of the opening 44 of each of the green filter units 42 to an area of the corresponding reflective electrode 420 is larger than the ratio of an area of the opening 44 of each of the red filter units 41 to an area of the corresponding reflective electrode 410, and larger than the ratio of an area of the opening 44 of each of the blue filter units 430 to an area of the corresponding reflective electrode 430. Similarly, the reflective regions corresponding to the red filter units 41 are brighter than those corresponding to the blue filter units 43. This is because the ratio of the area of the opening 44 of each of the red filter units 41 to the area of the corresponding reflective electrode 410 is larger than the ratio of the area of the opening 44 of each of the blue filter units 43 to the area of the corresponding reflective electrode 430. Thus the chromaticity of the reflective light meets the requirements of CIE chromaticity coordinates for display devices, which requires that the luminance of green light is the largest, the luminance of red light is the second largest, and the luminance of blue light is the smallest.

Furthermore, the luminance of the transflective LCD 200 at the transmissive regions corresponding to the green filter units 42 is larger than that of the transmissive regions corresponding the red filter units 41, because the area of each of the transmissive electrodes 520 is larger than the area of each of the transmissive electrodes 510. Similarly, the luminance of the transflective LCD 200 at the transmissive regions corresponding to the red filter units 41 is larger than that of the transmissive regions corresponding the blue filter units 43, because the area of each of the transmissive electrodes 510 is larger than the area of each of the transmissive electrodes 530. Thus the chromaticity of the transmissive light also meets the above-described requirements of CIE chromaticity coordinates for display devices.

Moreover, the color saturation of first portions of the outgoing reflective light passing through the openings 44 is lower than that of second portions of the outgoing reflective light passing through the colored parts of the color filter units 41, 42, 43 twice. This is because the first portions of the outgoing reflective light in general have only passed through the colored parts of the color filter units 41, 42, 43 once (along incoming paths), whereas the second portions of the outgoing reflective light in general have passed through the colored parts of the color filter units 41, 42, 43 twice (along incoming and outgoing paths). By comparison, outgoing transmissive light passes through the colored parts of the color filter units 41, 42, 43 once only. With the combined effect of the first and second portions of the outgoing reflective light, the difference between color saturation of the reflective regions corresponding to the reflective electrodes 410, 420, 430 and color saturation of the transmissive regions corresponding to the transmissive electrodes 510, 520, 530 can be reduced. This means that overall color saturation of outgoing light of the transflective LCD 200 can be more balanced.

When manufacturing the color filter layer 40 of the transflective LCD 200, only one kind of photolithography mask is needed. This is because the openings 44 of the red filter units 41, the green filter units 42, and the blue filter units 43 all have the same shape and the same area. Thus the cost of fabrication of the color filter layer 40 of the transflective LCD 200 can be reduced.

While the above description has been by way of examples and in terms of preferred embodiments, it is to be understood that the invention is not limited thereto. To the contrary, the above description is intended to cover various modifications and similar arrangements, including as would be apparent to those skilled in the art. Therefore, the scope of the appended claims should be accorded the broadest interpretation so as to encompass all such modifications and similar arrangements.

I claim:

1. A liquid crystal display panel, comprising:
    a first substrate comprising a color filter layer with a plurality of red filter units, a plurality of green filter units, and a plurality of blue filter units, each of the red filter units, the green filter units, and the blue filter units defining an opening, the openings of the red filter units; the green filter units, and the blue filter units having the same shape and the same area;
    a second substrate comprising a plurality of red sub-pixels, a plurality of green sub-pixels, and a plurality of blue sub-pixels corresponding to the red filter units, the green filter units, and the blue filter units respectively, wherein each of the red sub-pixels, the green sub-pixels, and the blue sub-pixels includes a transmissive electrode and a reflective electrode, the reflective electrodes correspond to the openings of the red filter units, the green filter units, and the blue filter units, and an area of the reflective electrode of each of the red sub-pixels, an area of the reflective electrode of each of the green sub-pixels, and an area of the reflective electrode of each of the blue sub-pixels are all different from one another; and
    a liquid crystal layer interposed between the first substrate and the second substrate.

2. The liquid crystal display panel as claimed in claim 1, wherein the area of the reflective electrode of each of the blue sub-pixels is larger than the area of the reflective electrode of each of the. red sub-pixels, and larger than the area of the reflective electrode of each of the green sub-pixels.

3. The liquid crystal display panel as claimed in claim 2, wherein the area of the reflective electrode of each of the red sub-pixels is larger than the area of the reflective electrode of each of the green sub-pixels.

4. The liquid crystal display panel as claimed in claim 1, wherein an area of the transmissive electrode of each of the red sub-pixels is larger than an area of the transmissive electrode of each of the green sub-pixels, and smaller than an area of the transmissive electrode of each of the blue sub-pixels.

5. The liquid crystal display panel as claimed in claim 1, wherein the openings of the red filter units, the green filter units, and the blue filter units have the same location in the respective red filter units, green filter units, and blue filter units relative to respective boundaries of the red filter units, green filter units, and blue filter units.

6. The liquid crystal display panel as claimed in claim 1, wherein the openings of the red filter units, the green filter units, and the blue filter units are substantially rectangular.

7. The liquid crystal display panel as claimed in claim 1, wherein the first substrate further comprises a common electrode layer adjacent to the color filter layer.

8. A liquid crystal display, comprising:
    a first substrate comprising a color filter layer with a plurality of red filter units, a plurality of green filter units, and a plurality of blue filter units, each of the red filter units, the green filter units, and the blue filter units defining an opening, the openings of the red filter units, the green filter units, and the blue filter units having the same shape and the same area;
    a second substrate comprising a plurality of red sub-pixels, a plurality of green sub-pixels, and a plurality of blue sub-pixels corresponding to the red filter units, the green filter units, and the blue filter units respectively, wherein each of the red sub-pixels, the green sub-pixels, and the blue sub-pixels includes a transmissive electrode and a reflective electrode, the reflective electrodes correspond to the openings of the red filter units, the green filter units, and the blue filter units, and an area of the reflective electrode of each of the red sub-pixels, an area of the reflective electrode of each of the green sub-pixels, and an area of the reflective electrode of each of the blue sub-pixels are all different from one another;

a liquid crystal layer interposed between the first substrate and the second substrate; and a backlight module adjacent to a side of the second substrate distal from the liquid crystal layer.

9. The liquid crystal display as claimed in claim 8, wherein the area of the reflective electrode of each of the blue sub-pixels is larger than the area of the reflective electrode of each of the red sub-pixels, and larger than the area of the reflective electrode of each of the green sub-pixels.

10. The liquid crystal display as claimed in claim 9, wherein the area of the reflective electrode of each of the red sub-pixels is larger than the area of the reflective electrode of each of the green sub-pixels.

11. The liquid crystal display as claimed in claim 8, wherein an area of the transmissive electrode of each of the red sub-pixels is larger than an area of the transmissive electrode of each of the green sub-pixels, and smaller than an area of the transmissive electrode of each of the blue sub-pixels.

12. The liquid crystal display as claimed in claim 8, wherein the openings of the red filter units, the green filter units, and the blue filter units have the same location in the respective red filter units, green filter units, and blue filter units relative to respective boundaries of the red filter units, green filter units, and blue filter units.

13. The liquid crystal display as claimed in claim 8, wherein the openings of the red filter units, the green filter units, and the blue filter units are substantially rectangular.

14. The liquid crystal display as claimed in claim 8, wherein the first substrate further comprises a common electrode layer adjacent to the color filter layer.

* * * * *